(12) United States Patent
Kreiner et al.

(10) Patent No.: US 10,438,108 B2
(45) Date of Patent: Oct. 8, 2019

(54) RADIO-FREQUENCY TAGS FOR SORTING POST-CONSUMPTION ITEMS

(71) Applicant: AT&T Intellectual Property I, L.P., Atlanta, GA (US)

(72) Inventors: Barrett M. Kreiner, Woodstock, GA (US); Donna K. Hodges, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/142,950

(22) Filed: Apr. 29, 2016

(65) Prior Publication Data

US 2016/0247058 A1 Aug. 25, 2016

Related U.S. Application Data

(63) Continuation of application No. 10/338,412, filed on Jan. 8, 2003, now abandoned.

(51) Int. Cl.

| | |
|---|---|
| *G06Q 10/00* | (2012.01) |
| *G06Q 30/02* | (2012.01) |
| *G06K 19/077* | (2006.01) |
| *B07C 5/34* | (2006.01) |
| *G06Q 10/08* | (2012.01) |

(52) U.S. Cl.
CPC ...... *G06K 19/07758* (2013.01); *B07C 5/3412* (2013.01); *G06Q 10/087* (2013.01); *G06Q 10/30* (2013.01); *G06Q 30/02* (2013.01); *Y02W 90/20* (2015.05)

(58) Field of Classification Search
CPC .................................................. G06K 19/07758
See application file for complete search history.

(56) References Cited

U.S. PATENT DOCUMENTS

| | | | | |
|---|---|---|---|---|
| 4,961,533 | A | * 10/1990 | Teller ........................ | B67D 1/06 |
| | | | | 177/25.19 |
| 5,423,431 | A | 6/1995 | Westin | |
| 5,497,140 | A | * 3/1996 | Tuttle ..................... | G01S 13/758 |
| | | | | 340/10.1 |
| 5,581,257 | A | * 12/1996 | Greene ................... | C30B 33/00 |
| | | | | 235/375 |
| 6,259,369 | B1 * | 7/2001 | Monico ............ | G06K 19/07749 |
| | | | | 156/291 |
| 6,332,098 | B2 | 12/2001 | Ross et al. | |
| 6,375,612 | B1 * | 4/2002 | Guichon .............. | A01K 11/008 |
| | | | | 119/51.02 |
| 6,557,758 | B1 * | 5/2003 | Monico ..................... | B07C 3/18 |
| | | | | 235/375 |

(Continued)

OTHER PUBLICATIONS

What you need to know about RFID, Automotive Manufacturing & Production Wastes, Feb. 2000.

(Continued)

*Primary Examiner* — Dennis W Ruhl

(57) ABSTRACT

An apparatus and method of selectively sorting post-consumption items that are associated with radio-frequency tags based on data received from the RF tag. One embodiment includes a conveyor, a picker arm, and an RF reader. Another embodiment includes an RF reader and a receptacle for selectively holding post-consumption items based on data retrieved from the associated RF tag.

6 Claims, 6 Drawing Sheets

(56) References Cited

U.S. PATENT DOCUMENTS

| | | | | |
|---|---|---|---|---|
| 6,640,052 | B1* | 10/2003 | Lao | B01D 3/42 |
| | | | | 202/202 |
| 7,030,760 | B1* | 4/2006 | Brown | B64F 1/368 |
| | | | | 235/384 |
| 2002/0054940 | A1* | 5/2002 | Grose | A22B 7/007 |
| | | | | 426/231 |
| 2002/0067267 | A1* | 6/2002 | Kirkham | B65D 5/4233 |
| | | | | 340/572.7 |
| 2002/0180603 | A1* | 12/2002 | Lyle | G08B 13/2462 |
| | | | | 340/572.9 |
| 2005/0043857 | A1* | 2/2005 | Van Fleet | G06Q 10/06 |
| | | | | 700/286 |
| 2010/0312601 | A1* | 12/2010 | Lin | G06Q 10/0637 |
| | | | | 705/7.36 |

OTHER PUBLICATIONS

An Appetite for Steel What Has 26 Hammers, 2,400 Horsepower and the Ability to Eat a Car in Seconds? It's The Shredder, Akron Beacon Journal, Mar. 28, 1996.
Website Printout: hitp://www.pnl.gov/nsd/commerical/rftags/market. html "RF Tags Market Information," printout Oct. 11, 2002.
Website Printout: http://ww.pnl.gov.nsd/commercial/rftags/background. html "RF Tags-Background," printout Oct. 11, 2002.

* cited by examiner

RADIO-FREQUENCY TAGS FOR SORTING POST-CONSUMPTION ITEMS

This application is a continuation of U.S. patent application Ser. No. 10/338,412, filed Jan. 8, 2003, now abandoned, is herein incorporated by reference in its entirety.

FIELD OF THE INVENTION

The invention relates to the field of post-consumer resource management. More particularly, the invention relates to using radio-frequency tags to sort post-consumption items.

BACKGROUND

Nearly everything we do leaves behind some kind of waste. During the 1980's, waste management issues became a matter of heightened public concern because of increasing waste production, shrinking landfill capacity, rising disposal costs, public opposition to new landfills, and public concern for the health of the planet. All of these factors have increased the importance of thoughtfully managing waste.

An article of waste can be considered to be unwanted matter, which is left after useful substances or parts have been used, or alternatively, an article of waste can be considered a post-consumption item or material, a resource to be recycled or handled in a particular way to increase usefulness or to decrease harmfulness. Almost all post-consumption items (which include both the post-consumption items themselves and/or the containers that house the items) are either recyclable or should be managed in some particular way (e.g., hazardous materials should be isolated from non-hazardous materials to avoid contaminating the non-hazardous materials, hazardous materials should be properly disposed).

Households, for example, typically generate recyclable post-consumption items and materials such as cereal boxes and other paper products, steel and aluminum cans, plastic milk and juice cartons, glass jars, and so on. Industries, manufacturers, commercial establishments, agricultural concerns and so on also typically generate recyclables.

Recycling is one method that increases the usefulness of post-consumption items. Recycling includes a series of activities associated with collecting and re-using materials that would otherwise fill landfills. Recycling includes sorting and processing recyclables into component materials and using these component materials to manufacture new products. Household and business-generated recyclables typically are collected at the curb, are taken to drop-off centers or buy-back centers, or are collected through deposit/refund programs. After collection, recyclables are typically sent to a materials recovery facility to be sorted and prepared into marketable commodities for input to further manufacturing processes. Recyclables generated by industries, manufacturers, agricultural concerns, and the like are frequently sold to materials recovery facilities, brokers, or manufacturers under private contracts.

Recycling typically depends largely on manual labor-intensive tracking and sorting operations. For example, consumers and businesses typically separate their post-consumption items into recyclables and non-recyclables, and separate recyclables into different categories (e.g., paper, plastic, aluminum, and so on). As with all manual labor-intensive activities, these processes are error prone. For example, a consumer may not have time or the inclination to separate recyclables from non-recyclables, resulting in recyclables that needlessly end up in an incinerator or landfill. There are other problems with manual sorting as well. A consumer may not place a recyclable in the proper recycling container (e.g., may place a glass jar in the "plastic" recycling bin). Hence, even after recyclables are sorted into categories, they typically are inspected and resorted before further processing, adding to the costs involved with recycling. Once separated and cleaned, these post-consumption items and materials may be ready to be recycled into new products.

More and more of today's products are being manufactured completely or partially from recycled materials. Consumers increasingly demand more environmentally-friendly products, thereby encouraging manufacturers to produce recycled products and to recycle items and materials used in the manufacturing process. It can only be expected that recycling will increase rather than decrease as the earth's resources are depleted and as people become increasingly concerned about the planet's health.

In addition to generating general recyclables, households may also produce post-consumption products containing hazardous materials that should receive special handling. For example, a diabetic in the household may generate, syringes, lancets, blood-contaminated alcohol pads, and the like. Empty (and not-so-empty) cans of paint and bug spray also constitute hazardous materials typically generated by households. This type of post-consumption product ideally should be separated from other products containing non-hazardous materials to prevent contamination of the non-hazardous materials, and typically should receive special treatment to reduce the volume or harmfulness of the hazardous material. Many household hazardous materials can also be recycled but may need special handling in the process.

Industries, manufacturers, commercial establishments, and agricultural concerns also typically create hazardous byproducts that may or may not be recyclable but should be tracked and handled in a particular way. In industry, a manifest is typically used to track and manage hazardous materials. The United States Environmental Protection Agency (EPA) regulates some types of hazardous waste by requiring that it be tracked with a manifest and by requiring those who generate, recycle, treat, store and/or dispose of hazardous wastes to have permits for their operation. Treatment of hazardous waste, like manual sorting of recyclables, is also subject to human error. For example, workers may incorrectly identify or classify hazardous wastes, leading to inefficiencies in processing, or worse. Many hazardous post-consumption products generated by industry can also be recycled to save resources and frequently, reduce production costs.

Hence, a need exists for an automated, less labor-intensive, less error-prone way to identify, track, sort, distribute, and broker post-consumption items and materials.

SUMMARY OF THE INVENTION

In the invention, the aforementioned need is satisfied by a system and method for sorting post-consumption items by using RF tags. RF tags applied to goods and materials that have been consumed or used and/or discarded or stored for recycling are read by a reader. The reader collects data from the tag and stores the data and/or transmits the collected data to a host computer. A computing device associated with the reader may also retrieve data associated with the RF tag from one or more datastores of information concerning the post-consumption item. The reader or host computer may perform additional processing to determine the composition and other attributes of the item or material. Based upon the data retrieved from the RF tag, and optionally, data in the datastore(s), and/or processing occurring within the associated computing device, characteristics including the composition and nature of the post-consumption items, location of the items, other characteristics of the items, and associated information are determined. This data is used in sorting tagged items for further processing.

BRIEF DESCRIPTION OF THE DRAWINGS

The foregoing summary, as well as the following detailed description of illustrative embodiments of the invention, will be better understood when read in conjunction with the appended drawings. For the purpose of illustrating the invention, there are shown in the drawings illustrative embodiments. As should be understood, however, the invention is not limited to the precise arrangements and instrumentalities shown. In the drawings.

DETAILED DESCRIPTION OF ILLUSTRATIVE EMBODIMENTS

Life Cycle of a Recycled Item

Figure 1:
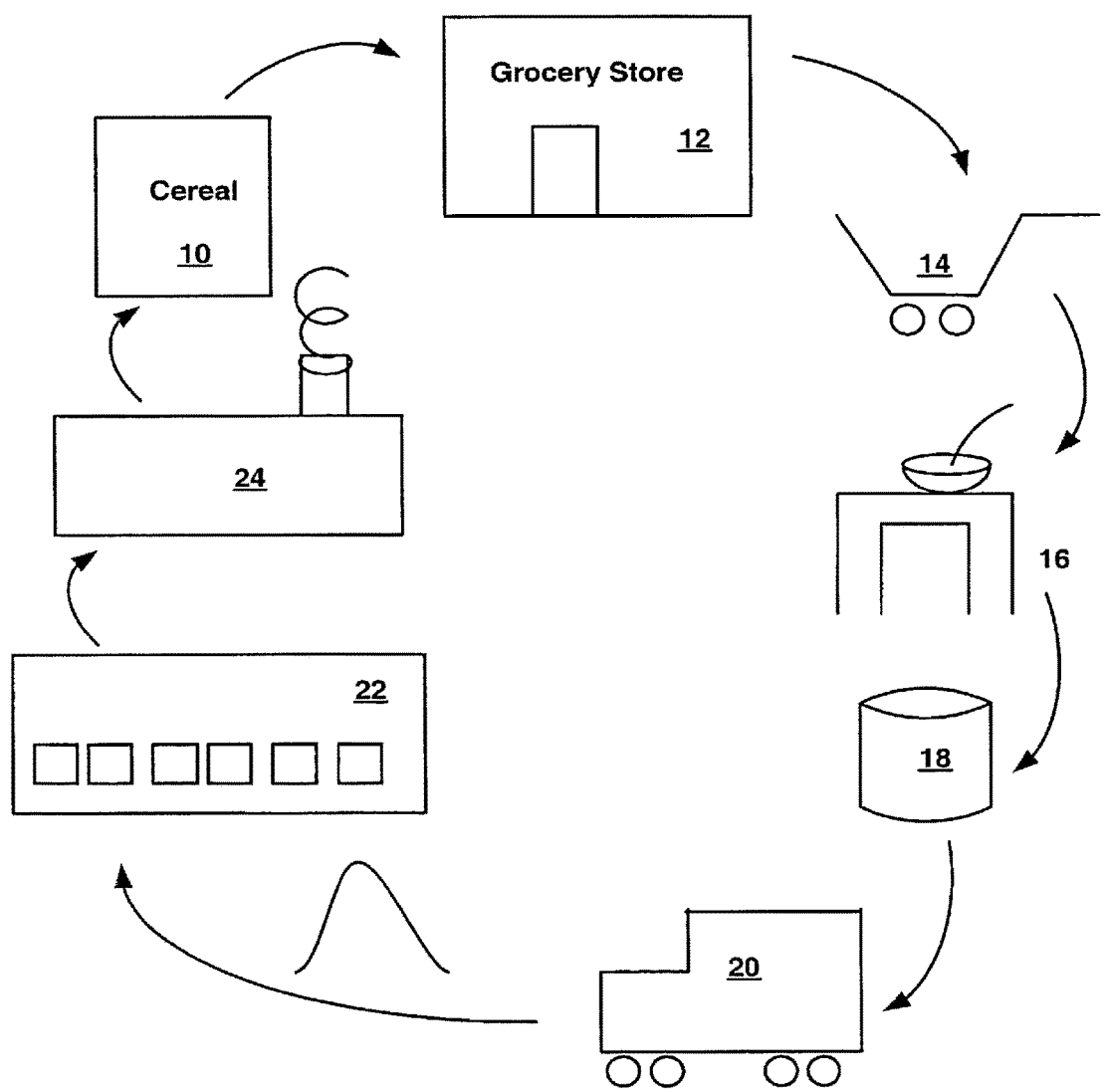
FIG. 1 illustrates an exemplary post-consumption item life cycle as is known in the art.

FIG. 1 illustrates an exemplary life cycle of an article that is recycled or processed. An item (e.g., a box to be filled with cereal) 10 is produced by a manufacturer 24, filled with cereal by the same or another manufacturer and is transported to a retail establishment such as a grocery store 12 for sale. A consumer may purchase 14 the item, consume or use it 16, and throw the item or the empty container in the garbage, trash or recycling 18. A waste management or recycling service 20 may collect the item and transport the item to a recycling, processing or disposal facility 22, or the like. Facility 22 may process the item so that the useful components of the item (e.g., paper) can be re-used at a manufacturer 24 to produce a new item (e.g., another cereal box to be filled with cereal).

RF Tag Post-Consumption Data Acquisition

Each post-consumption item may have a radio-frequency (RF) tag associated with it, thereby allowing more intelligent and automated processing of the post-consumption item. That is, after consumption or use, or upon designation of an item as "waste" or "to be recycled," an RF tag-based post-consumption data collection system and method retrieves data from the RF tag associated with the post-consumption item. A radio-frequency identification (RFID) system may be used, in which, data is carried in a tag or smart label and is retrieved by an RF reader and converted to machine-readable data. RFID systems offer an advantage over bar-coding because line-of-sight access to the tagged item is not necessary. RFID tags can be read through container walls, paint, dirt, and in cluttered areas. In addition, RFID tags can be read and written to at a range of up to hundreds of meters and more than 500 tags per second.

An illustrative RFID system comprises an RF reader and a RF tag that is electronically programmed with fixed (read-only) or variable (read-write) data. Data stored in the tag is received and decoded by the reader and transmitted to a host computer to be processed. Communication between the tag and the reader is wireless.

An RF tag can be active, passive, or semi-passive. An active tag is powered by a battery and can initiate communication with the reader. An active RF tag can be read and updated from distances of up to hundreds of kilometers. Passive and semi-passive tags are activated when they are read or interrogated by another device first and typically have shorter read ranges. The data on an RF tag, whether active, passive, or semi-passive can be added to or changed. RF tags may be a variety of shapes and sizes and may be housed in a protective covering, converted into paper labels, injected into plastic molds, inked onto surfaces, and so on. An RF tag may emit a series of waveforms that can be interpreted by the reader as a binary number. RF tags can be inexpensive to produce and can be read through a variety of substances such as water, paint, and dirt.

An RF reader typically comprises an antenna and a coupler. The antenna emits and receives radio signals to activate the tag and to read data from and write data to the tag. The antenna can produce an electromagnetic field ranging from one inch to 100 feet or more. The antenna transfers data to a coupler that controls data acquisition and communication.

The RF tag may be attached to, embedded within or otherwise associated with an item that has been used, consumed, designated for disposal or recycle, or the like. Alternatively, the RF tag may be attached to, embedded within, or otherwise associated with a container for such an item.

The data retrieved from the RF tag is collected by an RF reader and stored in one or more datastores of information concerning the post-consumption item. The data retrieved from the RF tag may be matched, combined with, added to or incorporated within one or more additional pre-existing datastore(s). The data may be stored and processed on a computing device associated with the reader and/or transmitted to a host computer for storage and processing. Characteristics such as, but not limited to, the composition and nature of the post-consumption item are determined. The data may be combined with other pre- or post-consumption item data, further processed, and provided for sale.

The data on the RF tag may also be updated. For example, the RF tag of the item may be updated with information such as the present location of the item, an identification number of the device updating the RF tag or any other suitable information.

The information from the RF tag may be collected when the item is placed in a waste or recycling receptacle or the like, or when the item is retrieved by a waste management or other type of retrieval agent, when the item arrives at a recycling, waste or other facility or at any other suitable time or combination thereof.

Actions to be taken concerning the item may be determined based on information retrieved from the RF tag. The item may be collected, sorted, processed, recycled, brokered, and/or disposed of in accordance to the determined characteristics of the item, based on the RF tag information.

Figure 2:
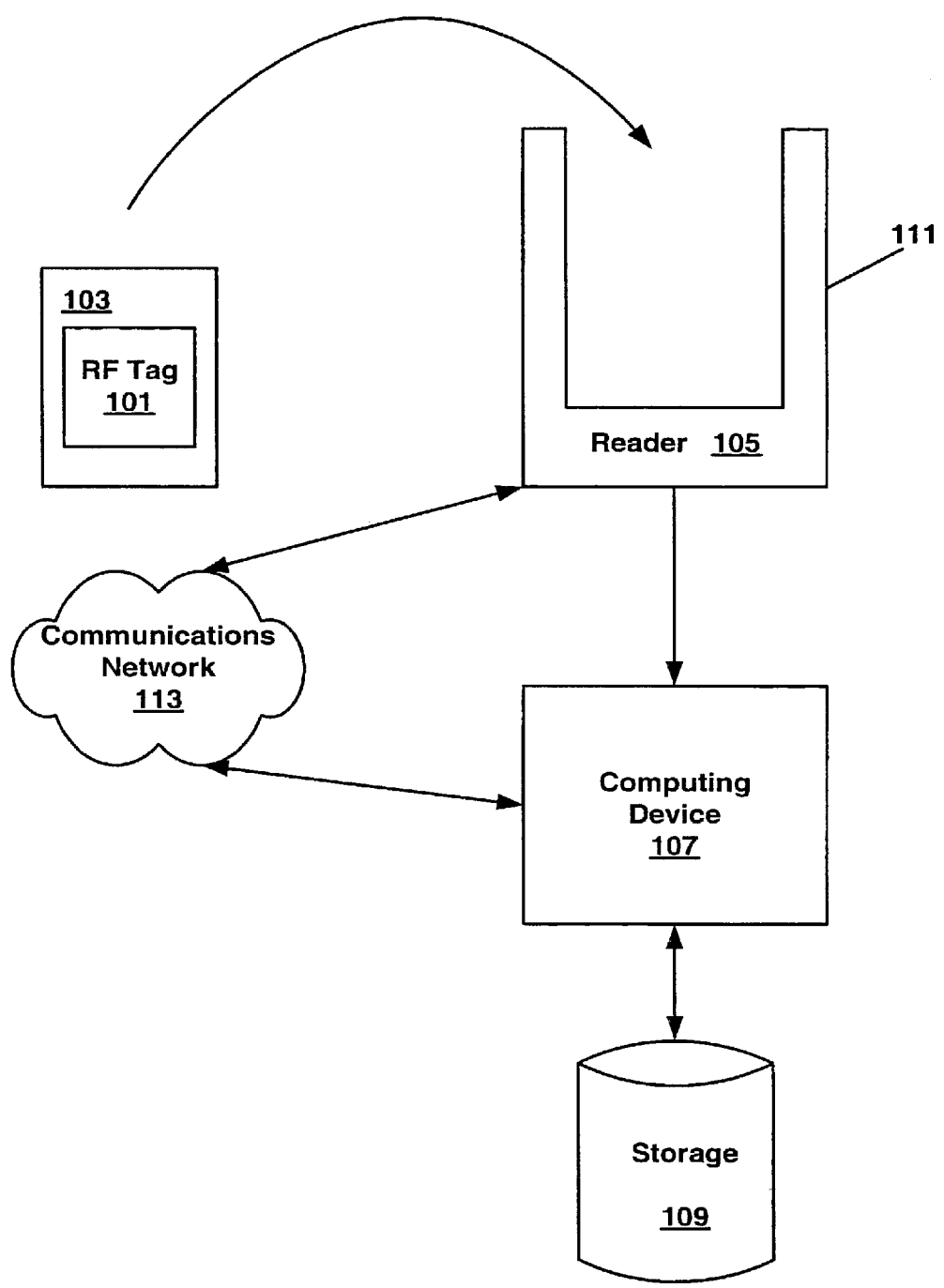
FIG. 2 illustrates, in a general block diagram form, an illustrative post-consumption data acquisition system in accordance with one embodiment of the invention.

Referring to FIG. 2, a system for identifying and collecting data concerning post-consumption items via an RF tag 101 includes a reader 105 for receiving, controlling, and transferring information ascertained from an RF tagged item or material (not shown) or RF-tagged receptacle or container 103 for such an item or material, and a computing device 107 for processing and storing the collected information. Computing device 107 may be associated with internal (not shown) or external storage media 109 for storing the RF tag data. Software resident at the computing device 107 or another device in communication with the computing device 107 or reader 105 may process and incorporate the collected information with information collected from other readers and optionally other computing devices. The system may include means for sorting, storing, processing, transmitting, and brokering the information.

The RF tag 101 may be embedded within the item or within an object attached to the item (such as, but not limited to, a label), applied to the surface of the item either directly or indirectly, attached to the item permanently or non-permanently, or otherwise suitably affixed to or associated with the item. Alternatively, RF tag 01 may be embedded within or applied upon a container 103 that holds the item or embedded within or applied upon an object attached to the container (such as but not limited to a label), applied to the surface of the container either directly or indirectly, attached to the container permanently or non-permanently, or otherwise suitably affixed to the container. For example, an RF tag may be inked onto a can by applying a non-conductive material to the can and then applying a circuit upon the non-conductive material by using a liquid metal ink.

The RF tag may be an active, passive, or semi-passive RF tag. The RF tag may be a read-only or a read-write tag. In one embodiment the RF tag is a read-write passive tag.

After RF-tagged item 103 or the material contained within RF-tagged item 103 has been used or when the RF-tagged item or material contained within the RF-tagged item is available for disposal, treatment, or recycling, item 103 may be placed within a receptacle 111 to which a reader 105 is attached or alternatively, may be placed in proximity to (within read range of) reader 105. Reader 105 may emit a radio-frequency of a specified frequency or frequency range. If RF tag 101 is a passive tag, the emission of the radio-frequency energy by the reader causes the passive RF tag 101 to emit a series of waveforms. Alternatively, if RF tag 101 is an active RF tag, RF tag 101 may emit the waveforms even if reader 105 does not generate RF energy.

The waveforms emitted by the RF tag may be interpreted by reader 105 as an identification code such as a binary number or as some other identifying code. In one embodiment, the code received by the reader is a relatively large binary number, on the order of 96 bits or more, but any suitable binary number or other identifying code may be emitted by the RF tag. The identification code may include any or all of the following data items:

a recyclable indicator to indicate whether the item or its contents can be recycled; a hazardous material indicator to indicate whether the item or its contents comprises a hazardous material;

a biodegradable indicator to indicate whether the item or its contents comprises a biodegradable material;

a recall indicator to indicate whether the item or its contents contains the subject of a recall;

a serial number for the item or its contents;

a production lot number for the item or its contents;

one or more location fields for tracking current and previous locations of the post-consumption item or it contents;

a date, such as but not limited to, a date of changes of location;

a weight of the item or its contents (for example, if the item is a can of dog food, the weight indicated here may be the weight of the empty can);

a volume of the item or its contents (for example, if the item is a can of dog food, the volume may be the space the compacted or uncompacted can may occupy in a receptacle);

one or more composition fields (for example, if the item is a computer, valuable recyclables may include the gold used in circuit boards, if the item contains a hazardous material, the amount of the hazardous material contained in the item, as manufactured, for example);

one or more subcomponent fields (for example, if the item is a computer, subcomponents may be circuit boards, memory, and batteries);

a reader identification number (identifying the particular reader that last updated the RF data, for example);

an identification of a reader owner (name, address, location, etc.);

one or more fields for an identification of a retrieval company (for example, the name of the waste management company and the name of the recycling service that the owner has contracted with for retrieval of post consumption items and material);

a shelf life of the item or contents of the item; and other suitable information.

The identification code and accompanying information may identify an item uniquely (e.g., a particular CD player) or may identify an item as belonging to a particular group of items (e.g., the RF tag may identify that a particular can of dog food was one of a group of cans of a particular brand of dog food produced by a particular manufacturing plant on a certain day or range of days).

Information concerning the above listed and other attributes may be updated on the RF tag.

Information retrieved from the RF tag may be collected and stored within datastore 109. A typical datastore may include the information retrieved from the RF tag and other data elements.

Reader 105 typically includes an antenna (not shown) for sending and receiving RF signals and for transferring the data received from RF tag 101 to a coupler (not shown). Reader 105 may include a coupler for receiving the data sent from the antenna. The coupler may be in communication with one or more computing devices 107 associated with internal or external datastores 109. The coupler may also be in communication with one or more computing devices connected to a network 113.

The coupler or computing device 107 may include software that processes the data received from RF tag 101. Alternatively, or additionally, the coupler may transmit the RF tag data to other computing devices via network 113 for processing and data storage. Computing device 107 may itself comprise a wired or wireless internal or external network of computing devices, such as but not limited to a LAN, WAN, intranet, the Internet, or any suitable network. The network 113 may comprise a wired or wireless network of connected computing devices. For example, the computing device 107 may comprise a building management system connected to network 113.

Hence, the coupler may transmit the data received from the antenna of reader 105 directly or indirectly via network 113 for processing on a computing device within network 113. The information collected from the RF tag reader 105 may be incorporated within a datastore of information including information collected by a plurality of readers at the same or different locations.

The data collected and compiled within one or more datastores within network 113 may be further processed, combined with other information, offered for sale, and sold. For example, the information retrieved from and written to RF tags may be used to show how items are being consumed or used. For example, marketers and retailers may use the data collected by RF tag readers to see how items are being used, as opposed to how items are being sold. As a specific example, an inventory system of a grocery store may show that a large quantity of an item has been sold during a particular time period. The grocery store management may find it helpful to know the consumption patterns of the item as well in order to predict future demand for the item. If most of the items are consumed or used quickly, it may be more likely that demand will increase, giving the grocery store notice that it should restock the item. On the other hand, if the item is not being consumed or used, perhaps the demand will not be as great because the purchasers still have the item and so have no need to purchase additional items. Information collected from a number of RF tags may be collected, processed, combined with information from other sources, sorted, filtered, and sold to interested parties or otherwise used.

Information concerning a post-consumption item may be linked (by serial number, for example) with information concerning the pre-consumed item collected by other data collection systems. Inventory systems keyed on data elements such as serial number, for example, stored in RF tags may be used to capture pre-consumer information with post-consumption information, thereby allowing the entire life cycle of an item to be tracked. This information may be useful to any number of entities, including retailers, manufacturers, distributors, and the like.

This data may be helpful to track consumer purchase versus consumer use patterns, which may be very useful in today's mobile society. For example, a pet owner who lives in Atlanta but has a cabin in the mountains may chose to purchase pet food in the mountains because pet food is less expensive there. A grocery store in Atlanta may find this information useful for pet food pricing decisions. A recycling facility may find it useful to know where items dropped off at the recycling center were originally purchased. Grocery stores, pharmacies, and retailers may find it useful to know how long it takes a particular item to go from being stocked on the shelf to being placed in a waste or recycling receptacle. This information may be correlated with item shelf life to determine the prevalence of storage of an item past its allowable shelf life. The information collected may be processed to provide information that is valuable to particular industries.

Sorting Apparatus

Commingled RF-tagged and untagged items may be sorted, based on data retrieved from RF tags associated with the items. If an RF-tagged item comes within reading proximity of the reader, the reader may receive the RF data from the RF tag and send the RF data to a coupler/computing device, as described above. The coupler/computing device may process the RF data to determine, for example, characteristics of the item, such as the composition (e.g., plastic, steel, aluminum, etc.) of the item. Alternatively, or in addition thereto, the coupler/computing device may match the RF data received from the antenna to a datastore of RF tag data to determine characteristics, etc. of the item. Characteristics of the item may include composition, whether the item is recyclable, whether the item is biodegradable, whether the item is the subject of a recall, whether the item is a hazardous material, the volume of the item (compacted or not compacted), the weight of the item, and the like. These and other characteristics may be determined from the data received from the RF tag and/or from the datastore(s) associated therewith, as described above.

For example, the first four digits of the serial number of the item may indicate the composition of the item. For example, items with serial numbers between 0000 and 0999 may denote plastics. By retrieving the serial number and determining that the first four digits of the serial number of the item fall within the range between 0000 and 0999, it may be determined that the item is plastic. Alternatively, the composition may be determined by matching the serial number or lot number of the post-consumption item to a datastore of items or materials. The datastore may contain the composition of the item or material. The coupler and/or associated computing device may capture and store information concerning the nature, number, volume, and weight of items currently stored within the receptacle associated with the reader. This information may be maintained in a datastore stored within the coupler/computing device. Instead, or in addition to maintaining the datastore, the coupler/computing device may transmit current contents information to another component, such as the facilities computer or to a network.

Figures 3A, 3B:
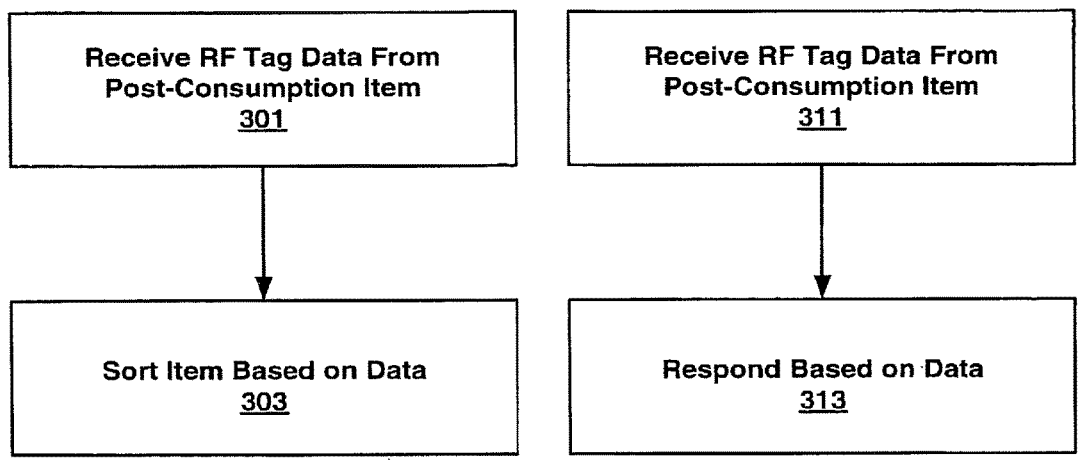
FIGS. 3a and 3b are flowcharts of illustrative processes for sorting post-consumption items in accordance with embodiments of the invention.

Also, the computing device may cause post-consumption items having RF tags to be sorted based on data included in the RF tags. FIG. 3a shows a flow chart of a method for selectively sorting post-consumption items based on RF tags associated with a post consumption item.

At step 301, the reader reads the data from the RF tag associated with a post-consumption item. The reader may read characteristics of the item which may include a composition of the item, whether the item is recyclable, whether the item is biodegradable, whether the item is the subject of a recall, whether the item is a hazardous material, the volume of the item (compacted or not compacted), the weight of the item, and the like. The reader may communicate the data to the computing device for processing.

At step 303, the computing device may cause the item to be sorted based on the data read from the RF tag. Sorting may be implemented in a variety of ways, as described in more detail below.

Figure 4:
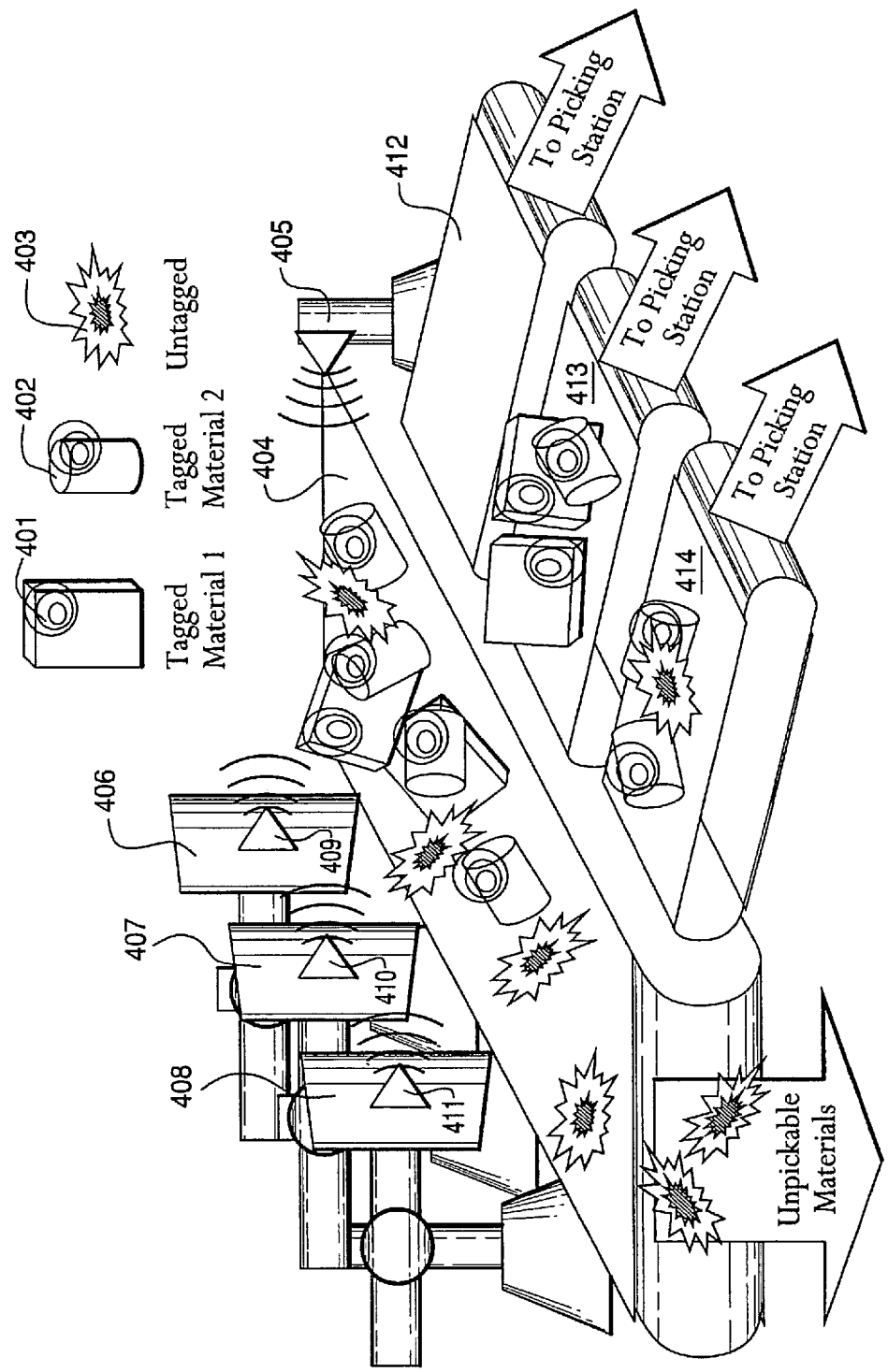
FIG. 4 is a diagram of an illustrative apparatus for sorting RF-tagged items in accordance with one embodiment of the invention.

FIG. 4 illustrates a sorting apparatus in accordance with one embodiment of the invention. Commingled tagged items 401, 402 and untagged items 403 are placed on a primary conveyor 404. Primary conveyor 404 may be positioned so as to readily receive the commingled items. As primary conveyor 404 transports commingled tagged items 401, 402 and untagged items 403, a reader 405 may read data from RF-tagged items 401, 402. Reader 405 or readers 409, 411, and 412, associated with pushing arms 406, 407, and 408 may determine the composition or other attributes of RF-tagged items 401, 402. Data from readers 405, 409, 411, and 412 may be processed by associated computing devices, as described above. The computing devices may return instructions and information to pushing arms 409, 410, and 411. In response to the information and instructions received from computing devices associated with this computing device or devices, pushing arms 409, 410, and 411 may push or otherwise convey the tagged items 401 and 402, based on composition or another suitable attribute determined from data retrieved from readers 405, 409, 410, and 411, onto corresponding secondary conveyor belts 412, 413, or 414.

While FIG. 4 illustrates push arms for transferring items from primary conveyor 404 to secondary conveyors 412, 413, and 414, other techniques may be implemented. For example, the apparatus may include a pick arm that grips the item, a magnetic device that secures the item magnetically, a pointed device that secures the item by piercing the item, a suction device that secures the item using suction, and the like. To assist the apparatus in locating the item, the apparatus may implement triangulation to determine an estimated location of the device and use the estimated location to transfer the item to a secondary conveyor 412, 413, or 414.

Figure 5:
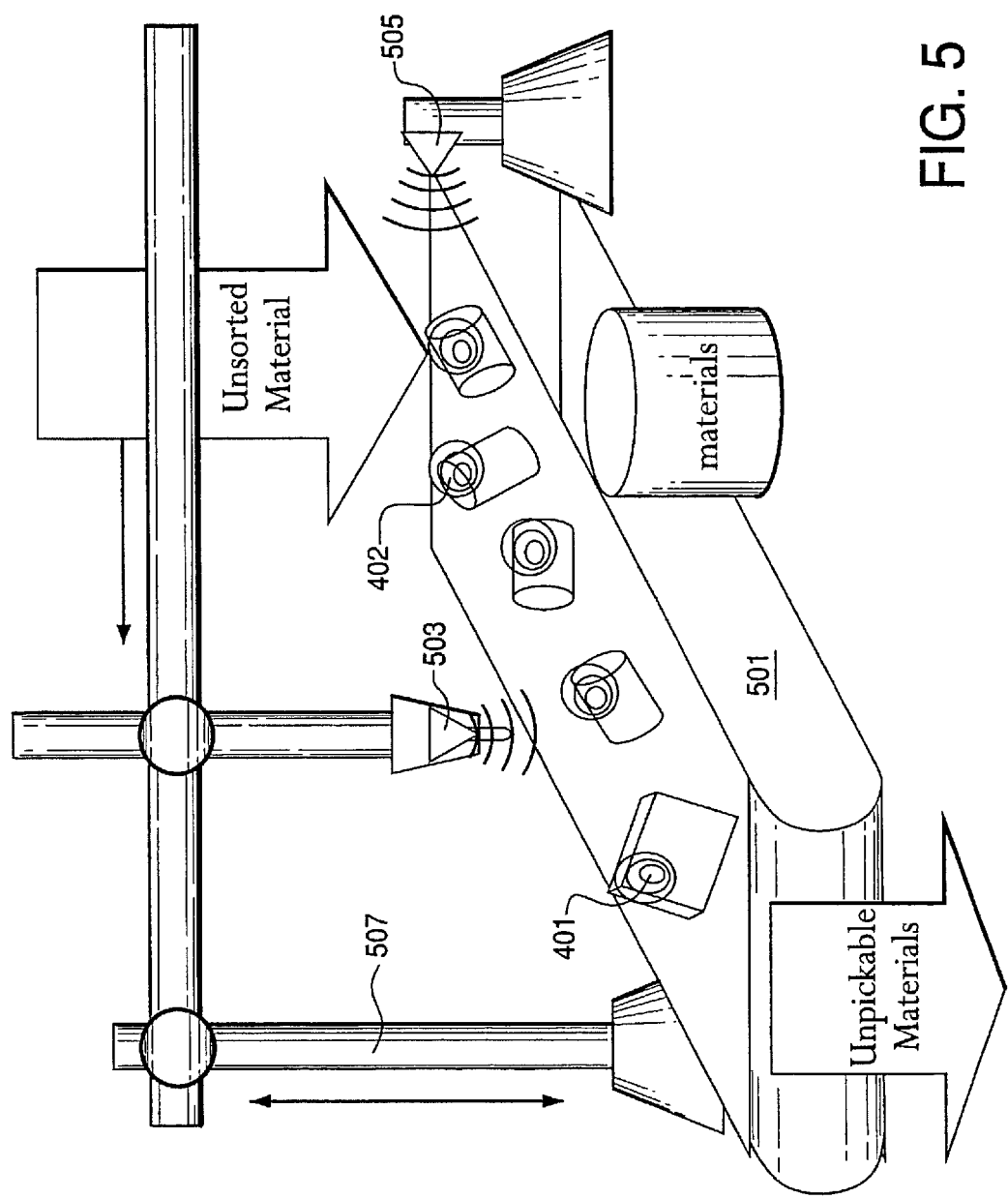
FIG. 5 is a diagram of an illustrative picker arm for sorting RF-tagged items in accordance with one embodiment of the invention.

For example, FIG. 5 illustrates a sorting apparatus according to another embodiment of the invention. Commingled tagged items 401, 402 and untagged items 403 may be placed on conveyor 501. Conveyor 501 may be a primary or secondary conveyor. Conveyor 501 may be positioned so as to readily receive the commingled items. As conveyor 501 transports the commingled tagged items 401, 402 and untagged items 403, a reader 505 may read data from RF-tagged items 401, 402. Alternatively, or in addition, reader 503 associated with picker arm 507 may read data from RF-tagged items 401, 402. Reader 503 associated with picker arm 507 may determine the composition or other attributes of the tagged items 401, 402 and may use the data retrieved from the RF tag to triangulate the position of tagged item 401, 402 for retrieval by picker arm 507. Picker arm 507 may be provisioned with suitable apparatus for retrieval of the selected tagged item 401, 402. For example picker arm 507 may be provisioned with a sharp pointed end to retrieve plastic items by stabbing the item, with a suction device to retrieve glass, with a magnet to retrieve iron-containing objects such as steel cans, and so on.

Figure 6:
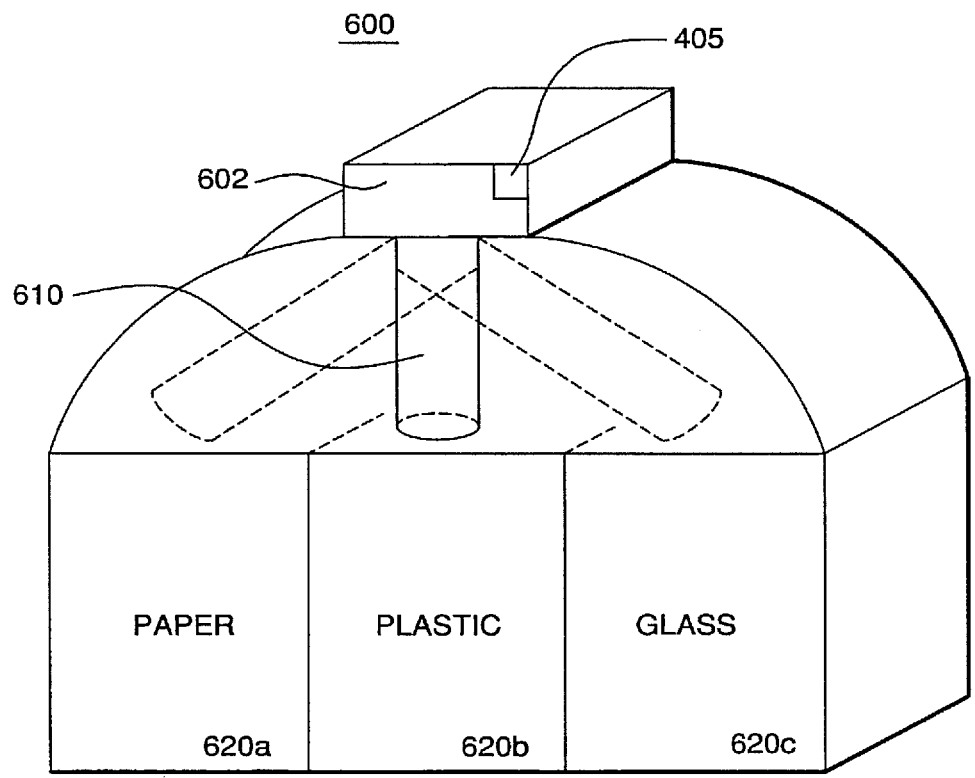
FIG. 6 is a diagram of an illustrative apparatus for holding RF-tagged items in accordance with one embodiment of the invention.
Figure 6:
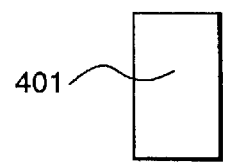

FIG. 6 illustrates an apparatus 600 for storing RF-tagged items. As the tagged item 401 approaches the opening 602 of the apparatus, the RF tag associated with item 401 is read by reader 405 and the composition of the tagged item 401 is determined as described above. In response to the determined composition (e.g., plastic) of the tagged item 401, the item 401 is chuted via a chute 610 to a storage container 620 for that type of item (e.g., a plastic storage container). Alternatively, separate receptacles 620 for different composition items may each be equipped with an RF tag reader. As an RF-tagged item 401 approaches the opening of the receptacle, the RF tag reader may read the RF tag associated with the item 401. In response to determining the composition of the tagged item 401 as described above, the receptacle may deliver an audible message. For example, if the receptacle is a plastic receptacle and the tagged item 401 is not plastic, the receptacle may sound an alert to inform the user that the wrong type of item is being placed in the receptacle. Alternatively, the receptacle may display a visual message. For example, if the receptacle is a plastic receptacle and the tagged item 401 is not plastic, but instead is a steel can, the receptacle may display the image of a crossed-out can and/or an image of a plastic milk carton that it is not crossed out to show the user that the steel can should not be placed within the receptacle and also optionally showing the user an image of an item that the receptacle is meant to hold. Optionally, if the user does not withdraw the improper item 401, an alarm may sound, thus encouraging the user to properly dispose of the tagged item 401.

Alternatively, a receptacle for general post-consumption items may include a reader and may automatically sort the post-consumption items into separate bins or containers. For example, if an RF-tagged item comes within proximity of the reader, the reader preferably identifies the item as described above. Perhaps the composition of the item is identified as plastic. Because the post-consumption item has been identified as plastic, the item may be chuted to a plastic recycling bin. For example, if the reader identifies the item as plastic, a panel to the plastic recycling bin may open as the item enters the receptacle, causing the plastic item to fall into the plastic bin. Alternatively, as the item approaches the reader, a visual display may indicate the correct receptacle to place the item in or the correct button to push. If the reader identifies the item as steel, a panel to the steel recycling bin may open. Alternatively, all items may be initially held within a common receptacle shaped as a funnel so that one item at a time is handled, identified, and chuted to the appropriate bin. Alternatively, the items may be identified by the reader and separated by a moveable arm based on the signals received by the arm concerning composition of the item, or based on attributes of the moveable arm. For example, a magnetized arm may be used to separate out steel items.

The receptacle just described may be a receptacle contained within a building or may be a receptacle affixed to a vehicle for transporting the items to a recycling, processing, or other facility, or may be a receptacle at the recycling, processing, or other facility. Hence, sorting of the post-consumption items may not occur until after the items have been picked up, delivered to the facility, or sorting may occur at some combination of locations.

It is noted that the foregoing examples have been provided merely for the purpose of illustration and explanation and are in no way to be construed as limiting of the invention. As an example, if a function such as maintenance and/or querying of a datastore query is attributed to a particular element such as a reader, it will be understood that the function may be performed alternatively or additionally by a building management component or by any suitable network element without departing from the spirit and scope of the invention.

What is claimed is:

1. A system comprising:
   a container of an item to carry a content;
   a radio frequency tag attached to the container or the content, the radio frequency tag storing machine-readable code comprising first data and second data, wherein the first data which, when read by a tag reader, provides information as to how the item was consumed, wherein the first data comprises at least two of: information relating to a previous location of the item, a recall indicator to indicate whether the item or the content is subjected to a recall, a date, a shelf life for the item or the content, a composition for the item or the content, or an identification number of a device that last updated the first data or the second data, wherein the second data which, when read by the tag reader interacting with a sorting apparatus, causes the sorting apparatus to sort the item as a post-consumption item in accordance with a type of action to be taken, the second data comprising information for identifying a retrieval company for providing a retrieval service for the post-consumption item and the type of action to be taken for the post-consumption item as one or more of: for recycling, for treatment as a hazardous waste, or for disposal as a biodegradable material; and
   the sorting apparatus to sort the container in accordance with the type of action to be taken.

2. The system of claim 1, further comprising:
a battery for powering the radio frequency tag.

3. The system of claim 1, wherein the radio frequency tag is an active radio frequency tag.

4. The system of claim 1, wherein the radio frequency tag is a passive radio frequency tag.

5. The system of claim 1, further comprising the tag reader.

6. The system of claim 1, wherein the sorting apparatus comprises a pushing arm for pushing the container into a bin in accordance with the type of action to be taken.

* * * * *